United States Patent [19]

Braden et al.

[11] Patent Number: 4,767,904
[45] Date of Patent: Aug. 30, 1988

[54] STRUCTURE AND METHOD OF INCREMENTAL ORBITAL ELECTRICAL DISCHARGE MACHINING

[75] Inventors: Donald E. Braden, Clinton; Nick T. Sharoian, Westland; Tony L. Mansour, Clawson, all of Mich.

[73] Assignee: Edmusa, Inc. (Subsidiary of Nelson Liquid Drive), Brighton, Mich.

[21] Appl. No.: 828,368

[22] Filed: Feb. 11, 1986

[51] Int. Cl.⁴ .............................................. B23H 7/28
[52] U.S. Cl. .............................. 219/69 V; 204/129.7; 219/69 M
[58] Field of Search ............... 219/69 V, 69 E, 69 G, 219/69 R, 69 M; 51/90; 204/129.7, 224 M

[56] References Cited

U.S. PATENT DOCUMENTS

| | | | |
|---|---|---|---|
| 2,715,806 | 8/1955 | Hancock | 51/90 |
| 3,430,026 | 2/1969 | O'Connor | 219/69 V |
| 3,526,060 | 9/1970 | Hall et al. | 51/90 |
| 3,629,540 | 12/1971 | Altfeld et al. | 219/69 V |
| 3,725,631 | 4/1973 | Angelucci et al. | 219/69 V |
| 4,091,713 | 5/1978 | Kennedy | 51/90 |
| 4,156,327 | 5/1979 | O'Connor | 219/69 E |
| 4,224,495 | 9/1980 | Fricker et al. | 219/69 V |
| 4,230,926 | 10/1980 | Gaumond | 219/69 V |
| 4,316,071 | 2/1982 | Bonga | 219/69 E |
| 4,361,745 | 11/1982 | Rupert et al. | 219/69 G |
| 4,387,284 | 6/1983 | Nicholas et al. | 219/69 V |
| 4,409,457 | 10/1983 | Takahashi et al. | 219/69 E |
| 4,425,492 | 1/1984 | Wyss | 219/69 V |

FOREIGN PATENT DOCUMENTS

| | | | |
|---|---|---|---|
| 55-90233 | 7/1980 | Japan | 219/69 V |
| 843548 | 8/1960 | United Kingdom | 219/69 G |
| 2072562A | 10/1981 | United Kingdom | 219/69 G |

Primary Examiner—G. P. Tolin
Assistant Examiner—Geoffrey S. Evans
Attorney, Agent, or Firm—Harness, Dickey & Pierce

[57] ABSTRACT

A method of electrical discharge machining and an electrical discharge machine apparatus therefor, consisting of rotating an electrode about an axis of rotation and simultaneously orbiting the electrode about an orbital axis which is parallel and in transverse spaced relation to its axis of rotation while maintaining the radially outer surface of the electrode in electrical discharge machining relation to a work piece, and, further, moving the electrode radially outwardly in increments.

12 Claims, 3 Drawing Sheets

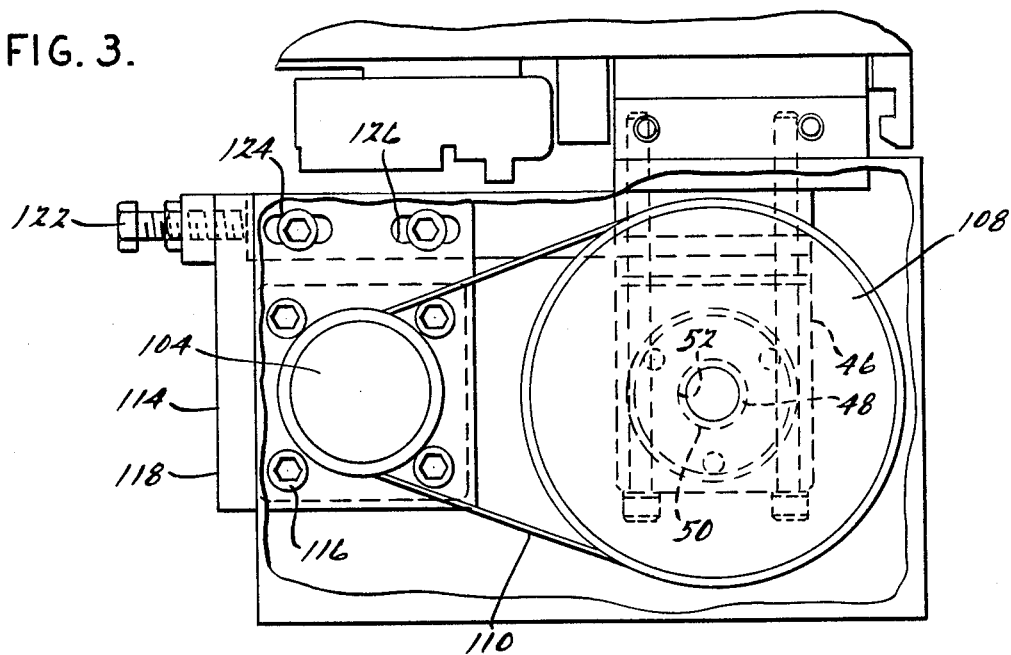
FIG. 3.
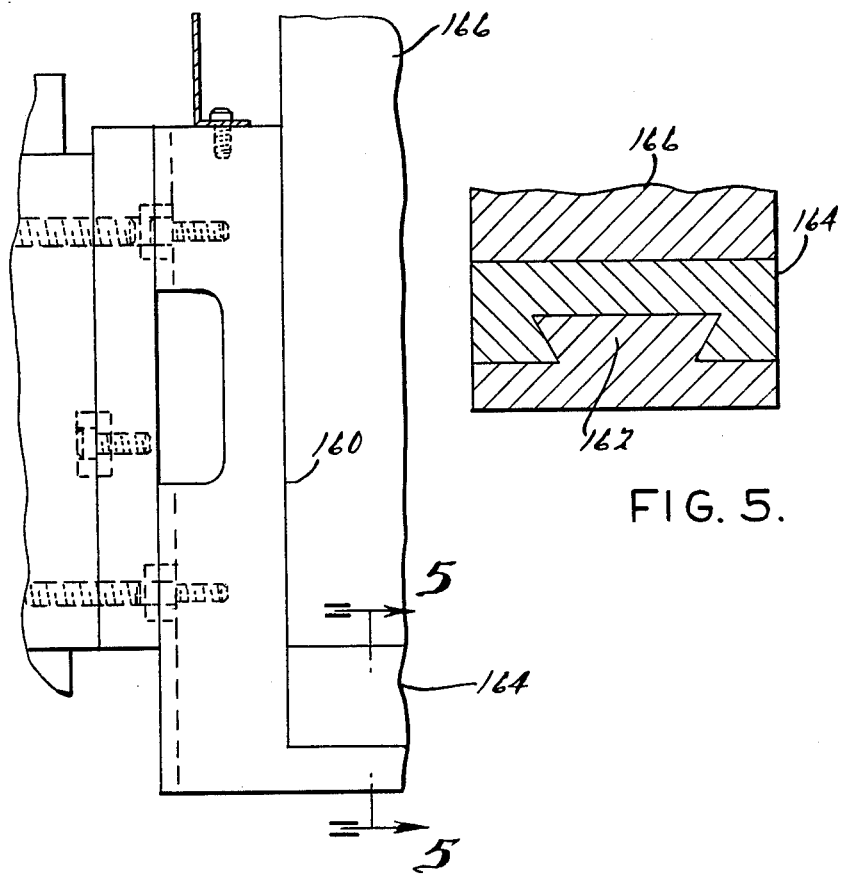
FIG. 4.
FIG. 5.

STRUCTURE AND METHOD OF INCREMENTAL ORBITAL ELECTRICAL DISCHARGE MACHINING

BACKGROUND OF THE INVENTION

1. Field of the Invention

The invention relates to electrical discharge machining and refers more specifically to a solar system attachment for an electrical discharge machine whereby an electrode utilized in electrical discharge machining is simultaneously rotated at a relatively high speed, orbited at a relatively low speed and moved radially at a servo controlled speed in predetermined steps to accurately machine internal or external surfaces of a work piece.

2. Description of the Prior Art

In the past, electrical discharge machining has most often been accomplished by linear movement of an electrode provided with a cross section the same as or very similar to the cross section of an opening to be electrically machined. The linear movement of the electrode in such operations has in the past been axial of the electrode and servo controlled in accordance with electrical parameters of the machining desired. Such plunge type electrical discharge machining is not suitable for finishing large internal or external circular surfaces, the concentricity of which must be exact.

It has also been known to separately rotate an electrode during electrical discharge machining to provide equal electrode wear over the exterior surface of the electrode, and to separately orbit an electrode about an axis in spaced relation to the electrode to permit electrical machining of an opening larger than the cross section of the electrode with the electrode.

However, the combination of servo controlled, stepped, radial, linear movement, orbital movement and rotational movement of an electrode taking place simultaneously to effect precision machining of internal or external circular surfaces of a work piece is not believed to have been accomplished in the past with a structure which may be attached to a conventional electrical discharge machine ram on a standard electrical discharge machine.

SUMMARY OF THE INVENTION

The invention is a unique solar system structure for and method of precisely electrically machining internal and external generated surfaces on a work piece.

The method includes the steps of first linearly moving an electrode into transverse spaced relation to a circular or similar generated surface to be machined, moving the electrode radially to a predetermined orbital radius for the electrode and subsequently simultaneously rotating the electrode about an axis through the electrode, orbiting the electrode about an orbital axis parallel and in transverse spaced relation to the electrode and radially moving the electrode in steps, one step per orbit of the electrode, while electrical discharge machining with the electrode. In accordance with the method of the invention the electrode is rotated substantially faster than it is orbited, and radial movement of the electrode is servo controlled, in accordance with the electrical parameters of the electrical discharge machining.

The structure of the invention comprises an attachment adapted to be connected to the ram of an electrical discharge machine including an orbital spindle and means for driving the orbital spindle in rotation at a variable speed, a slide including two separate parts one of which is secured to one end of the orbital spindle, means for moving the separate parts of the slide relative to each other transversely of the axis of rotation of the orbital spindle under servo control in accordance with the electrical parameters of electrical discharge machining with the electrode and in steps, one step for each orbit of the electrode, a rotary spindle secured to the other part of the slide, means for rotating an electrode secured to the rotary spindle and quick clamp structure for mounting the electrode on the rotary spindle.

The structure of the invention could within the scope of the invention be included in the initial design of electrical discharge machining equipment rather than being an attachment thereto.

BRIEF DESCRIPTION OF THE DRAWINGS

FIG. 3 is a top view of the electrical discharge machining attachment of the invention taken in the direction of arrow 3 in FIG. 1.

FIG. 4 is a partial elevation view of the electrical discharge machining attachment of the invention, similar to FIG. 2 and showing an alternate structure for securing the attachment to the ram of an existing electrical discharge machine.

FIG. 5 is a partial cross section of the modified structure illustrated in FIG. 4 taken substantially on the line 5—5 in FIG. 4.

DESCRIPTION OF THE PREFERRED EMBODIMENT

Figure 1:
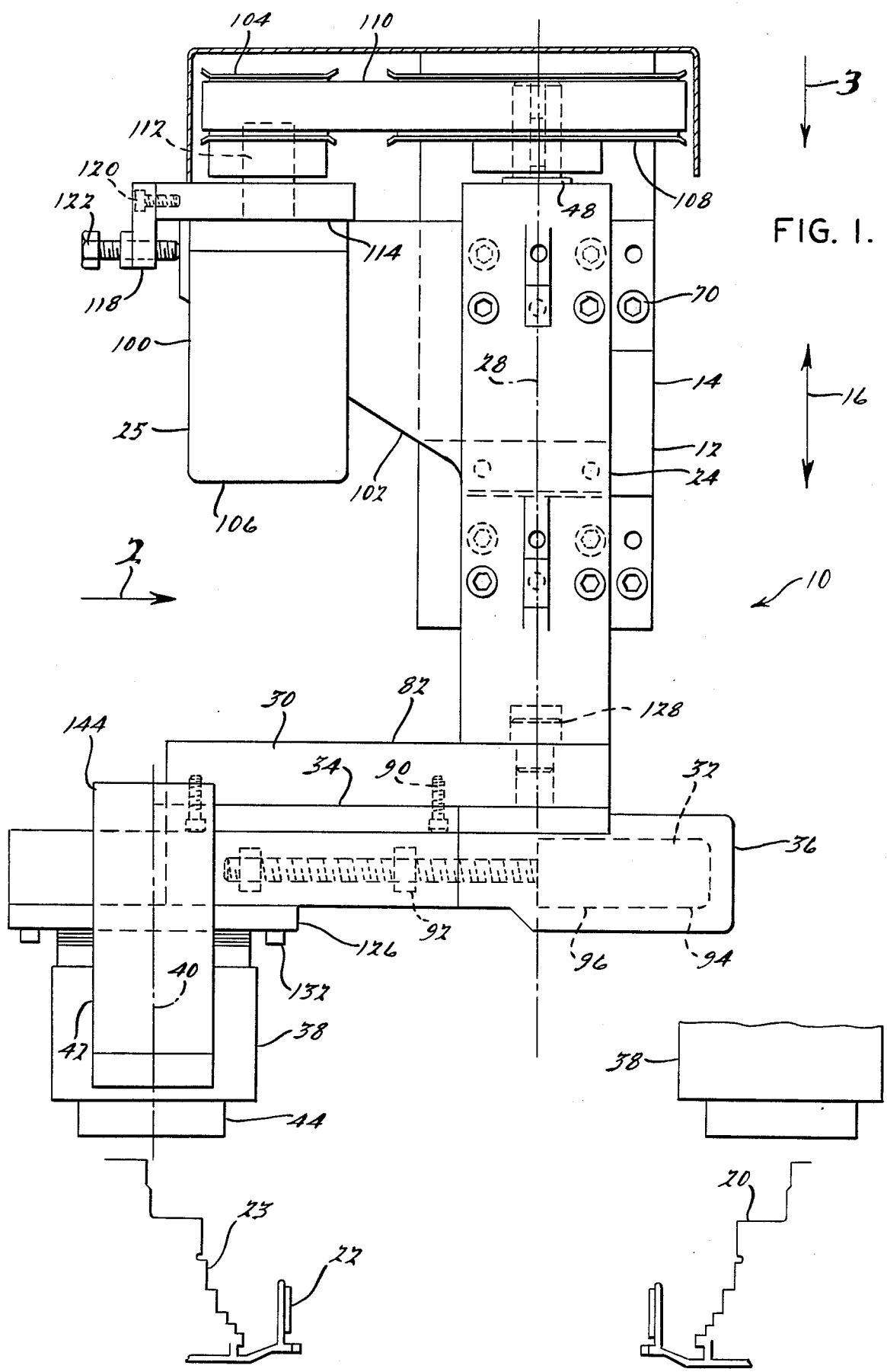
FIG. 1 is an elevation view of the solar system electrical discharge machining attachment of the invention for performing the method of the invention.

The solar system attachment 10 of the invention as shown in FIG. 1 is secured to the ram 12 of a conventional electrical discharge machine 14 in position over a work piece 20 which it is desired to machine therewith. Electrical discharge machines are well known. Therefore, the construction and operation of the electrical discharge machine 14 of which the ram 12 is a part will not be considered in detail.

For the purpose of the present invention, the electrical discharge machine 14 must include means for linearly moving the ram 12 in the directions of the arrows 16 in FIG. 1. Provision must also be provided for driving a servo motor contained in the electrical discharge machining attachment 10 in accordance with parameters of electrical discharge machining with the electrode 18 by the electrical discharge machine 14.

Similarly, the work piece 20 forms no part of the present invention and will not be considered in detail. The work piece 20 may, however, be a portion of a turbine engine requiring exact concentric machining of circular surfaces 22, 23, etc. The surfaces 22 and 23 may be either internal or external circular surfaces. Work piece 20 may also be honeycomb shields utilized in turbine engines, as well known by those in the art.

Figure 2:
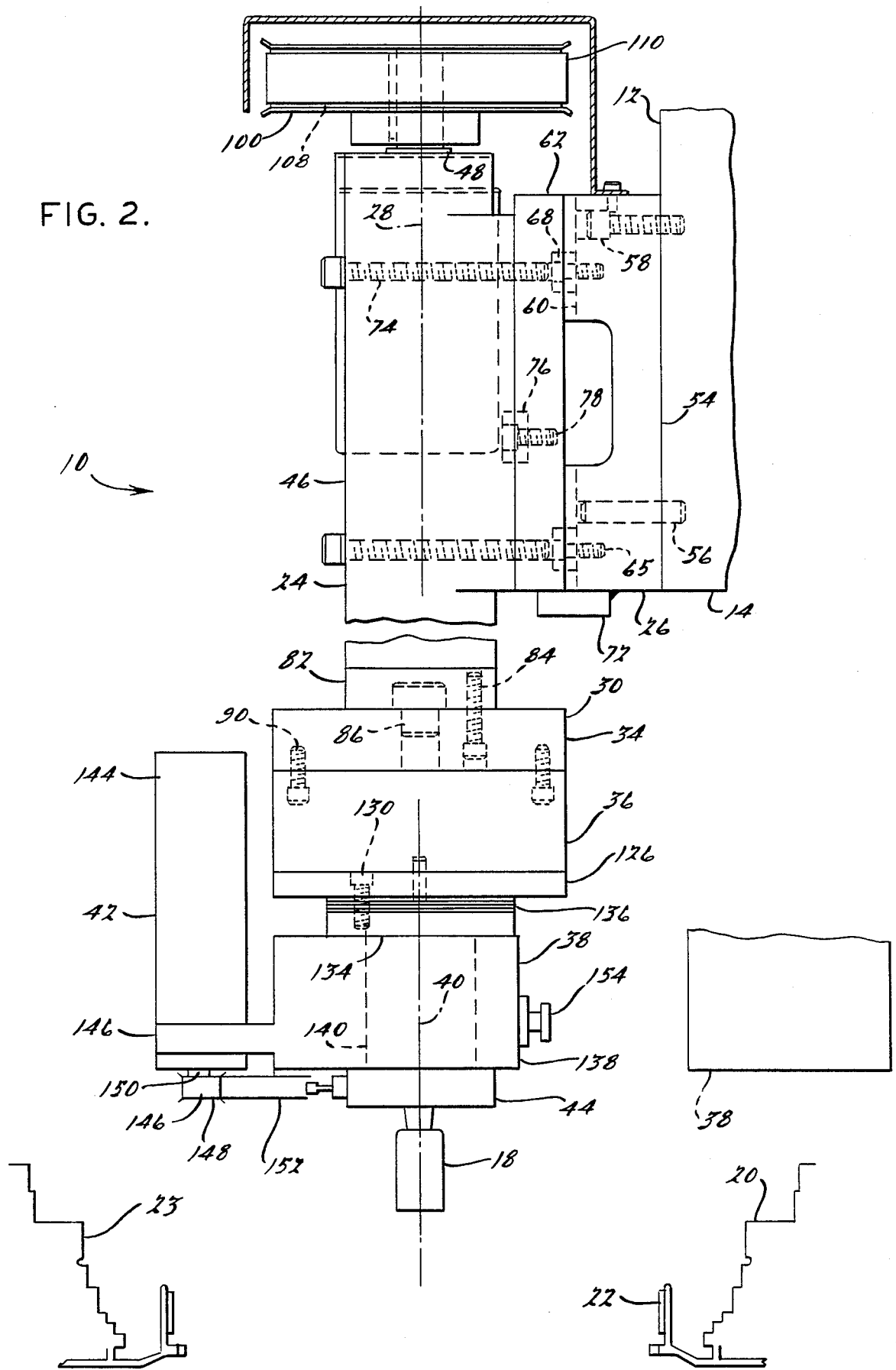
FIG. 2 is another elevation view of the electrical discharge machining attachment of the invention taken in the direction of arrow 2 in FIG. 1 substantially at 90° with respect to the elevation of FIG. 1.

The electrical discharge machining attachment 10 includes an orbital spindle 24, means 26, shown best in FIG. 2, for supporting the orbital spindle 24 from the ram 12 of the electrical discharge machine 14 and means 25 for driving the orbital spindle 24 in rotation about the orbital axis 28 of the spindle 24.

As shown best in FIG. 1, a slide 30 is secured to the spindle 24 and includes means 32 for moving the slide parts 34 and 36 relative to each other transversely of the axis of rotation 28 of the orbital spindle 24.

Further, in accordance with the invention, the electrical discharge machining attachment 10 includes the rotary spindle 38 which is secured to the slide part 36 having an axis of rotation 40 parallel and in transverse spaced relation to the orbital axis of rotation 28, as shown best in FIG. 1. Means 42, shown best in FIG. 2 are provided for rotating the rotational spindle 38 on the axis 40.

The cylindrical electrical discharge electrode 18 is secured to the rotary spindle 38 on the axis of rotation 40 by a quick clamp electrode holder 44, as shown best in FIG. 2.

More specifically, the orbital spindle 24 includes an outer housing 46, an inner cylindrical shaft 48 rotatably mounted in an axially extending bore 52 in the housing 46.

The means 26 for supporting the orbital spindle 24 from the ram 12 of the electrical discharge machine 14 includes a spacer 54 located on the ram 12 by means of dowel pins 56 and secured thereto by bolts 58. The spacer 54 includes an axially extending slot 60 therein. A bracket 62 is positioned adjacent the spacer 26 and is keyed and bolted to spacer 26 within slot 60 by keys 68 bolted to spacer 54 with bolts 65 and bolts 70. The orbital spindle 24 is secured to the bracket 62 by key 76 bolted to bracket 62 by bolt 78 and bolts 74. Bracket 62 rests on the stop 72 welded to the bottom of the spacer 26 as shown in FIG. 2.

Drive structure 100 for the spindle 24 is supported on the extension 102 of the bracket 62 as best shown in FIG. 1. The drive structure 100 includes a smaller pulley 104 secured to the drive shaft 112 of a variable speed motor 106 and a larger pulley 108 secured to the cylindrical rotatably mounted portion 48 of the orbital spindle 24 and a drive belt 110 extending between and around the pulleys 104 and 108. The motor 106 is secured to a motor mounting plate 114 by convenient means such as bolts 116.

An adjusting member 118 is secured to the mounting plate 114 by convenient means such as bolts 120. An adjusting bolt 122 extends through the adjusting plate. 118 and is adapted to engage the mounting bracket portion 102 to adjust the position of the mounting plate 114 and in particular the pulley 104 with respect to the pulley 108. To permit adjustment of the position of the pulley 104 for tensioning the belt 110, the mounting plate 114 is attached to the mounting bracket 102 by bolts 124 in elongated slots 126 in the mounting plate 114, as shown best in FIG. 3.

On actuation of the motor 106 at a preset speed, the motor 106 is caused to rotate shaft 112, pulley 104, belt 110 and pulley 108 to rotate the cylindrical portion 48 of the orbital spindle 24. The electrode 18 is thus advanced in an orbital movement around the orbital axis 28 of the orbital spindle 24 at a selected relatively low speed, as will be seen subsequently.

A slide mounting plate 82 is secured to the spindle shaft 48 for rotation therewith by bolts 84. Locator 86 accurately positions the spindle 24 relative to the mounting plate 82.

As shown best in FIGS. 1 and 2, the precision ball slide 32 includes the part 34 secured to the slide mounting plate 82 by convenient means such as bolts 90, the part 36 supported from the part 34 and movable relative thereto transversely of the axis 28 of the orbital spindle 24 and the adjusting mechanism 94. Adjusting mechanism 94 includes an electric stepping motor 96 and nut and screw mechanism 92 positioned between the parts 34 and 36 of the slide 32. Part 34 of the slide 32 is secured to the spindle 24 for rotation therewith about the orbital axis 28.

The motor 96 is servo driven in accordance with electrical discharge machining parameters of the electrical discharge machine 14 in accordance with the usual servo drive of an electrode in electrical discharge machining. In accordance with the invention the initial radial position of the electrode 18 is preselected and the electrode 18 is stepped radially outwardly on completion of each orbit of electrode 18 to a preset finished diameter.

The rotary spindle 38, as shown best in FIGS. 1 and 2, is secured to the slide part 36 by convenient means such as the mounting plate 126, which is attached to the slide part 36 by bolts 132, by the insulated bolts 130 extending through the plate 126. The spindle 38 as shown is separated from the plate 126 by the insulating pad 136 positioned between the plate 126 and spindle housing 138. The rotary spindle housing 138 is thus rigidly secured to and insulated from the slide part 36.

The cylindrical rotary portion 140 of the rotary spindle 38 is mounted for rotation in the spindle housing 138 for rotation about axis 40. The cylindrical rotary portion 140 of the spindle 38 is rotated by means of the drive structure 42, including the variable speed motor 144 mounted on the extension 146 of the housing 138, the pulley 148 secured to the drive shaft 150 of the motor 144, and the drive belt 152.

A quick clamp coupling 44 is provided on the end of the cylindrical portion 140 of the spindle 38 and receives the cylindrical electrode 18 for rotation on the rotary axis 40 of the rotary spindle 38, as best shown in FIG. 2.

Electrical discharge machining energy is passed through the fitting 154, spindle 38 and coupling 44 to the electrode 18 to effect electrical discharge machining in the usual manner.

In overall operation of the electrical discharge machining attachment 10, with the work piece 20 positioned on a work table (not shown), which in the usual manner may be emmersed in a dielectric material, the electrical discharge machine ram 12 is caused to move linearly in the direction of arrow 16 toward the work piece to align the electrode 18 transversely with respect to the surface to be machined. The electrode 18 is then moved radially into a position for effecting servo controlled electrical discharge machining of a surface of the work piece 20, as for example circular surface 22, by means of adjusting the precision slide 32 to an initial preset position.

The electrode 18 is then rotated at a selected, variable, relative high speed by means of the rotary spindle 38 about the axis of rotation 40 thereof, and is simultaneously orbited at a selected variable, relatively low speed about the orbital axis 28 of the orbital spindle 24. During the orbital movement of the electrode 18, the electrode is moved radially outwardly of the work piece under servo control in accordance with electrical discharge machining parameters. The radial electrode movement is in preset stepped increments, one increment per completed orbit of the electrode. The rotary spindle speed may vary up to 500 revolution per minute.

Exactly concentric machining of the surface 22 and other desired surfaces such as surface 23 may thus be accomplished by the use of the electrical discharge machining attachment 10 in conjunction with the electrical discharge machine 14.

Further as will be readily apparent to those in the art a standard plunge type electrical discharge machine may be converted to a solar system electrical discharge machine by utilization of the attachment 10.

As shown in FIG. 4, the spacer 26 may be replaced by an L-shaped bracket 160 having a dovetail portion 162 thereon for use with standard electrical discharge machines having a quick change dovetail platen 164 on the end of the ram 166 thereof. With such quick change dovetail tooling the solar system attachment of the invention may be rapidly and accurately secured to and removed from a standard plunge type electrical discharge machine.

While one preferred embodiment and a modification of the present invention have been considered in detail, other embodiments and modifications of the invention are contemplated. Thus, for example, the movement of the electrode 18, that is both rotation about its own axis and orbital movement about an orbital axis may be accomplished in the original design of an electrical discharge machine within the scope of the invention. Also the orbital movement of the electrode 18 may be servo controlled if desired. It is the intention to include all such embodiments and modifications thereof as are defined by the appended claims within the scope of the invention.

We claim:

1. An attachment for an electrical discharge machine comprising electrode mounting means supporting an electrode and rotating it about the electrode axis of rotation extending through the electrode, and a spindle having an axis of rotation, drive means for rotating the spindle about its axis of rotation and an arm secured to the spindle for rotation therewith and for mounting the electrode with the axis of rotation parallel and in spaced relation to the axis of the spindle, said arm supporting and orbiting the electrode mounting means around the axis of said spindle and about an orbital axis parallel and in transverse spaced relation to the electrode axis of rotation and means for linearly translating the electrode mounting means along the electrode axis.

2. Structure as set forth in claim 1 wherein the electrode mounting means includes a quick clamp electrode holder positioned on the axis of rotation of the electrode.

3. Structure as set forth in claim 1 wherein the means for supporting and rotating the electrode comprises a spindle having an axis of rotation congruent with said orbit axis and drive means operably connected to the spindle for rotating the spindle about its axis of rotation.

4. Structure as set forth in claim 3 wherein the drive means comprises a motor and belt and pulley drive structure between the spindle and motor.

5. Structure as set forth in claim 1 wherein said arm comprises a slide having a first part secured to one end of the spindle and a second part to which the electrode is secured and means for driving the second part linearly with respect to the first part transversely with respect to the axis of rotation of the spindle.

6. Structure as set forth in claim 5 wherein the means for driving the second part of the slide relative to the first part of the slide comprises a servo controlled stepping motor driven screw and nut structure secured between the first and second parts of the slide.

7. An electrical discharge machine including a linearly movable ram, an orbital spindle having an axis of rotation parallel to the axis of linear movement of the ram, means supporting the orbital spindle from the ram for linear movement therewith, means carried by the means for supporting the orbital spindle from the ram and connected to the orbital spindle for rotating the orbital spindle at a variable speed, a slide including a first part secured to one end of the orbital spindle for rotation therewith and a second part movable relative to the first part in a direction perpendicular to the axis of rotation of the orbital spindle, a drive structure secured to and operable between the first and second parts of the slide for moving the second part of the slide relative to the first part, a rotary spindle carried by the second part of the slide having an axis of rotation parallel and in transverse spaced relation to the axis of rotation of the orbital spindle, means supported on the rotary spindle for rotating the rotary spindle at a variable speed, and means for securing an electrode to one end of the rotary spindle.

8. Structure as set forth in claim 7 wherein the means for securing the electrode to the rotary spindle comprises a quick clamp electrode holder.

9. The method of electrical discharge machining with an electrode having an axis of rotation, comprising rotating the electrode about its axis of rotation and simultaneously orbiting the electrode about an orbital axis which is parallel and in transverse spaced relation to the axis of rotation of the electrode while maintaining the radially outer surface of the electrode in electrical discharge machining relation to a work piece, by servo controlled movement of the electrode radially outward.

10. The method as set forth in claim 9 wherein the electrode is moved radially in preselected increments.

11. The method as set forth in claim 10 wherein the electrode is moved radially one increment for each complete orbit of the electrode.

12. The method as set forth in claim 9 and further including moving the axis of rotation of the electrode and the axis of orbit of the electrode transversely with respect to each other prior to electric discharge machining with the electrode.

* * * * *